United States Patent [19]
Jacobsen

[11] Patent Number: 4,840,416
[45] Date of Patent: Jun. 20, 1989

[54] SYSTEM COMPRISING A POWER-ACTUATED GRIPPER AND A NUMBER OF GRIPPING OBJECTS, ESPECIALLY FOR USE IN AN AUTOMATED FOUNDRY PLANT, WITH FLUID COMMUNICATION BETWEEN SAID GRIPPER AND A GRIPPING OBJECT BEING GRIPPED BY IT

[75] Inventor: Ole A. Jacobsen, Tisvildeleje, Denmark

[73] Assignee: Dansk Industri Syndikat A/S, Herley, Denmark

[21] Appl. No.: 108,392

[22] Filed: Oct. 14, 1987

[30] Foreign Application Priority Data

Oct. 14, 1986 [DK] Denmark ............................ 4898/86

[51] Int. Cl.⁴ .......................... B25J 15/06; B25J 9/14
[52] U.S. Cl. ......................................... 294/2; 294/88; 294/97; 901/31; 901/40
[58] Field of Search ...................... 294/2, 86.4, 88, 97, 294/106; 414/737, 744 B, 752; 901/40, 41, 30, 31, 36, 37

[56] References Cited

U.S. PATENT DOCUMENTS 4,561,506 12/1985 Booker ............................ 901/41 X
4,615,374 10/1986 Persson ............................ 164/442
4,664,588 3/1987 Newell et al. .................... 901/41 X
4,737,611 4/1988 Humbolt ........................... 901/30 X

FOREIGN PATENT DOCUMENTS 0078897 4/1986 European Pat. Off. .
2710481 6/1978 Fed. Rep. of Germany .
86/00033 1/1986 PCT Int'l Appl. .

*Primary Examiner*—Johnny D. Cherry
*Assistant Examiner*—Dean J. Kramer
*Attorney, Agent, or Firm*—Larson and Taylor

[57] ABSTRACT

In a system comprising a gripper (9) and a number of gripping objects (7), and with fluid-communication couplings for establishing temporary fluid communication between the gripper (9) and the gripping object (7) being gripped, the novel feature consists in that the coupling comprise at least one tubular member (30) with at least one open end being adapted to be pressed against and to make fluid-tight contact with a plane surface (37) on the gripping object (7) having fluid-transfer openings (39) with somewhat smaller diameter than the open ends of the tubular member (30). With this arrangement, the risks of damage and other problems associated with previous coupling arrangements based on the male-female principle are avoided.

6 Claims, 3 Drawing Sheets

SYSTEM COMPRISING A POWER-ACTUATED GRIPPER AND A NUMBER OF GRIPPING OBJECTS, ESPECIALLY FOR USE IN AN AUTOMATED FOUNDRY PLANT, WITH FLUID COMMUNICATION BETWEEN SAID GRIPPER AND A GRIPPING OBJECT BEING GRIPPED BY IT

TECHNICAL FIELD

The present invention relates to a system with a gripper and a number of gripping objects, said system being of the kind set forth in the preamble of claim 1.

BACKGROUND ART

Systems of the kind referred to above are used in automated foundry plants, in which a gripper moved and controlled by a programmed mechanical manipulator is adapted to move gripping objects, e.g. so-called core masks, from one station to another, and to perform various control operations on same, such as supplying vacuum for lifting associated mould cores or supplying compressed air to various mechanisms in the core mask itself.

In previous systems of the kind referred to above, problems have arisen in connection with the relative movements between the gripper and the gripping objects, when the distance between the gripper and the gripping object in question is small, such as when the gripping object is about to be gripped or just after its release from the gripper. These problems are due to the construction of the means for establishing temporary fluid communication between the gripper and the gripping object, these means in said previous systems often comprising coupling members based on the male-female principle, i.e. with one coupling part being inserted into an opening in the other. The problems themselves are mainly (a) that it may be difficult to mate the two coupling parts in each pair, and (b) that relative movement between the gripper and the gripping object in directions transverse to the coupling and decoupling direction may cause damage to projecting parts of the coupling means.

DISCLOSURE OF THE INVENTION

It is the object of the present invention to provide a system of the kind referred to above, in which the abovementioned problems do not arise, and which is safe and reliable in operation, and this object is attained by means of a system, according to the present invention being characterized by the arrangement and features set forth herein.

Various embodiments directly supporting the effect of the features set forth herein are described. Also described herein is an improvement in the gripping mechanism for providing improved stability in the mechanical connection between the gripper and the gripping object, and hence improved reliability of the fluid-communication coupling means.

BRIEF DESCRIPTION OF THE DRAWING

In the following detailed specification the invention is explained with reference to the drawings, in which FIG. 1(a)–1(d) in perspective shows four stages in operation of an automatic foundry manipulator, illustrating one possible use of a gripper in a system according to the invention.

DESCRIPTION OF THE PREFERRED EMBODIMENT

Figures 1A, 1B:
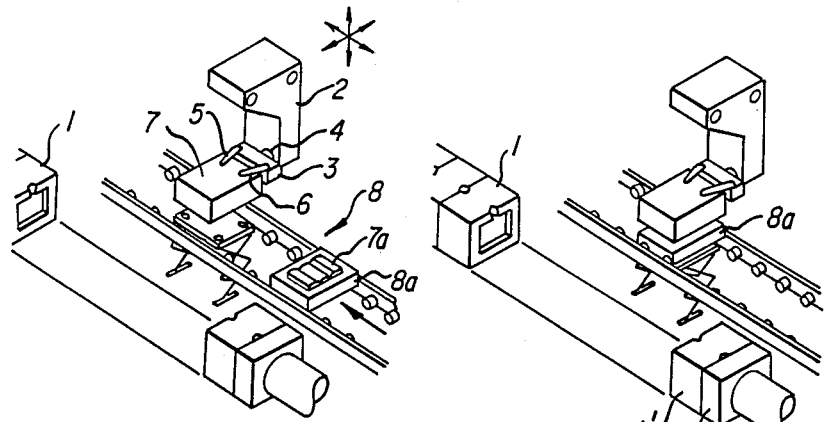
Figures 1C, 1D:
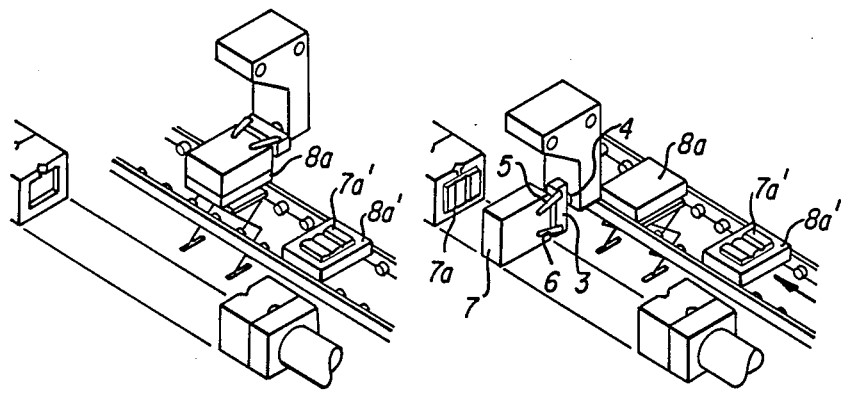

FIGS. 1a–d show an example of the use of the gripper in a system according to the present invention. These Figures show a part of an automated foundry plant, in which a mould 1 is provided with cores delivered by a conveyor 8 by means of a mechanical manipulator 2, movable in three directions at right angles to each other. The manipulator 2 comprises a gripper 3, rotatably mounted on the manipulator 2 by means of a shaft 4, so that it may be oriented in various directions as indicated on the drawing. The structure carrying the manipulator is not shown, but may comprise known components adapted to perform the requisite movements of the manipulator 2 and the gripper 3, as well as actuating the latter's two gripping jaws 5 and 6. In operation, the manipulator 2 is moved between the various positions shown, so that the gripper 3 may grip a core mask 7 which, e.g. by using suction, picks up a core 7a having been delivered on a conveyor pallet 8a by the conveyor 8, and move the core mask 7 with the core 7a for inserting the latter into its proper position in the mould 1, if necessary also performing other operations. After the insertion of the core 7a a new mould 1' is conveyed to the mould 1 by a pusher 1a, after which the conveyor 8 delivers a new pallet 8a' with a new core 7a', whereupon the process continues in a cyclic manner as described. The gripper 3 engages and disengages the mould part 7 by suitable movement of the gripping jaws 5 and 6, to be described below with reference to FIGS. 2 and 3.

Figure 2:
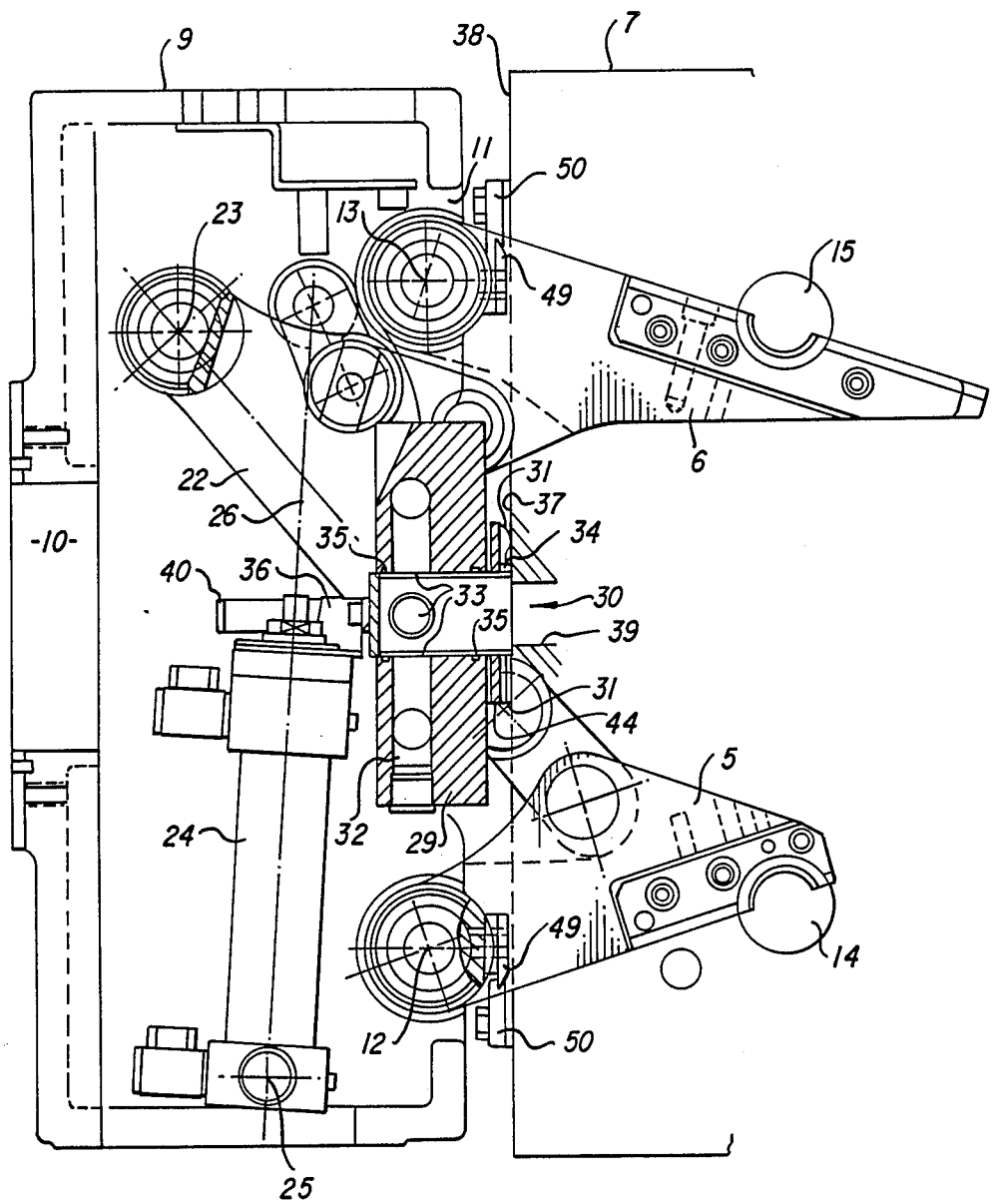
FIGS. 2 and 3 show the gripper with its jaws in their gripping position and their position of rest respectively, drawn as if some of the various parts were partly transparent, together with sectional views of the fluid-communication coupling means, taken in two different planes parallel to the plane of the drawing, the sectional plane of FIG. 2 being closer to the viewer than that of FIG. 3.
Figure 3:
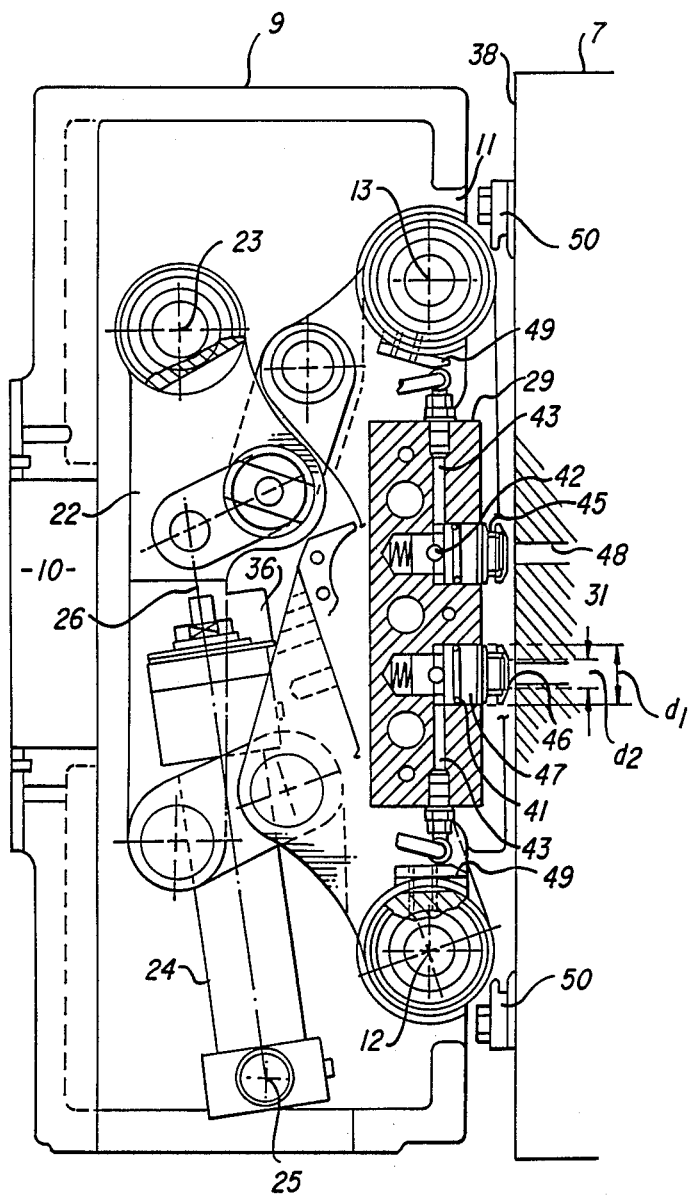

As can be seen from FIGS. 2 and 3, the gripper 3 comprises a box-shaped housing 9 with a socket 10 for securing the housing 9 to the shaft 4 (not shown in Figures 2 and 3) as well as an opening 11 to allow the movement of the two gripping jaws, i.e. a first gripping jaw 5 and a second gripping jaw 6, out of into the box-shaped housing 9.

The housing 9 comprises four mutually parallel bearings or bearing shafts, which are stationary—except for minor adjustments—in the housing 9 and serve as fixed pivots for the mechanism actuating the gripping jaws. In the following, they will be identified by reference numbers connected to their axis points in the drawing.

The first gripping jaw 5 is pivotably supported by a first gripping-jaw bearing 12, and the second gripping jaw 6 is pivotably supported by a second gripping-jaw bearing 13 in the manner shown, so that the two jaws 5 and 6 may be swung out of and into the box-shaped housing 9 between the positions shown in FIGS. 2 and 3. In the gripping position shown in FIG. 2, the jaws 5 and 6 each engage an engagement knob 14 and 15 respectively on the core mask 7. The engagement knobs 14 and 15 and the portions of the jaws 5 and 6 adapted to engage them may be shaped in a suitable manner to ensure a firm grip, e.g. as shown and described in the Danish Patent Application No. 1683/83 corresponding to U.S. Pat. No. 4,615,374.

In the position of rest shown in FIG. 3, the jaws 5 and 6 are withdrawn into the housing 9 in such a manner, that the first jaw 5 is behind the second jaw 6. This spacesaving arrangement is analogous to the arrangement shown and described in the above-mentioned Danish Patent Application No. 1683/83, and also to the arrangement shown and described in the co-pending Danish Patent Application No. 4897/86 (DPK 332-32), corresponding to U.S. patent application Ser. No. 108,391 filed Oct. 14, 1987.

In order to effect the requisite movements of the gripping jaws 5 and 6 into or out of the housing 9, the gripper 3 comprises an actuating mechanism comprising two knee-joint linkages, one for each gripping jaw 5 and 6, said linkages having a common lever 22 pivotally supported in the housing 9 by means of a common-level bearing 23, being one of the above-mentioned four mutually parallel bearings or bearing shafts, which are mounted stationary and adjustably in the housing 9. This actuating mechanism is described in more detail in said co-pending Danish Patent Application No. 4897/86 (DPK 332-32), corresponding to U.S. patent application Ser. No. 108,391 filed Oct. 14, 1987. It is, however, within the scope of the present invention to use other actuating mechanisms, such as the one described in the above-mentioned previous Danish Patent Application No. 1683/83, corresponding to U.S. Pat. No. 4,615,374.

The movement from the gripping position shown in FIG. 2 to the position of rest shown in FIG. 3 and vice versa is effected by means of a double-acting hydraulic cylinder 24 (or an equivalent linear motor) pivotally supported in the housing 9 by a cylinder bearing 25, and having its piston rod 26 (here symbolized only by its centre line) connected to a suitable point in the actuating mechanism.

The housing 9 also comprises a connector block 29 containing various conduits for vacuum and compressed air and in the example shown a vacuum connector 30 shown in Figure 2 and two compressed-air connectors 31 shown in Figure 3. The connector block 29 is secured in the housing 9 by means not shown, preferably having facilities for adjusting the connector block 29 relative to the housing 9.

The part of the connector block 29 shown in FIG. 2 comprises—apart from the vacuum connector 30—a vacuum conduit 32 connectable by means not shown, such as suitable flexible tubes etc., to an external source of vacuum, said source being adapted to apply vacuum in a controlled manner corresponding to the functions to be carried out, such as lifting and moving a core 7a and 7a' as mentioned above with reference to FIG. 1. The vacuum conduit 32 is in permanent communication with the inside of the vacuum connector 30 through suitable side openings 33 in the vacuum connector 30, the latter being open and having a sealing lip 34 of rubber or the like at its end facing outwards, and being closed at its other end as shown.

The vacuum connector 30 is slidably supported in the connector block 29 and suitably sealed against the latter by O-rings 35 or the like. Further, the vacuum connector 30 is—in the gripping position shown in FIG. 2—held in the forwardly extended position shown in FIG. 2 by a pusher finger 36 secured to the free end of the hydraulic cylinder 24, the latter in this gripping position being in a maximum clockwise position. When the gripper 3 is being disengaged from the core mask 7, the cylinder 24 moves away from the position shown in FIG. 2 in the anti-clockwise direction, and will eventually (in a position not shown) abut against a retracter 40 connected to the vacuum connector 30 to return to the latter a retracted position (not shown), the pusher finger 36 at the same time being withdrawn.

The forward end of the vacuum connector 30 is adapted to engage a substantially plane portion 37 in the end wall 38 of the core mask 7, said plane portion 37 comprising a vacuum transfer opening 39 connected to further conduits (not shown) within the core mask 7 and leading to vacuum-operated means in the latter, such as suction discs for carrying out the above-mentioned lifting function. The comparatively soft sealing lip 34, being tapered in its unloaded condition (not shown), will be held in sealing engagement with the plane portion 37 by the atmospheric pressure, this holding action ceasing—of course—when the supply of vacuum is terminated.

As shown in FIG. 2, the vacuum transfer opening 39 is smaller than the cooperating end opening in the vacuum connector 30. This means that minor misalignments between the axes of the two openings will not cause leakage in the connection, provided that the sealing lip 34 is allowed to make contact with the plane portion 37 along its entire periphery.

The compressed-air connectors 31 shown mainly in Figure 3 are in the form of cylindrical plugs or piston slidably supported in suitable bores in the connector block 29 and sealed therein by suitable O-rings 41 or the like. The air connectors 31 are both hollow and open at both ends, and have side openings 42 communicating the inside of each connector 31 with a compressed-air conduit 43 connectable to external sources of compressed air, such as through suitable flexible tubes, said sources being controllable with a view to selective operation of air-actuated means within the core mask 7, such as means for holding core parts during the transfer of the core mask 7 from one station to another.

In FIG. 3, the compressed-air connectors 31 are shown in their retracted position out of engagement with the plane portion 37 on the end wall 38 of the core mask 7. When the gripper 3 is operated, i.e. the gripping jaws 5 and 6 are moved from the position of rest shown in Figure 3 to the gripping position shown in FIG. 2, a fork plate 44 secured to the vacuum connector 30 and with two cutouts engaging corresponding grooves 45 in the compressed-air connectors 31 moves with the vacuum connector 30, thereby moving also the compressed-air connectors 31 outwardly (to the right in FIG. 3) to an engagement position (shown in FIG. 2), in which they abut against the plane portion 37 with their forward end surfaces, especially with contact sealing rings 46 suitably embedded to project slightly beyond the rigid body of each connector 31, so as to provide an effective seal in the engagement position.

The compressed air supplied through the conduits 43 may have a high pressure, for which reason an effective seal is important, both in order to save power and to avoid noise from compressed-air leaks. To this end, the compressed-air connectors 31 are shaped with different effective diameters $d_1$ and $d_2$ of their thickest body portions 47 and their end sealing rings 46 respectively, the former diameter $d_1$ being the larger, so that the resultant force due to pressures acting on the connectors 31 will be directed outwardly (i.e. to the right in Figure 3), i.e. to press the connectors 31 against the plane surface portion 37 with a force, the magnitude of which increases with increasing air pressure in the conduits 43. This happens, of course, only when the connectors 31 are in sealing contact with the plane surface portion 37 and compressed air is supplied through the conduits 43.

When the compressed-air connectors 31 are in the above-mentioned engagement position, their end sealing rings 46 surround air-transfer openings 48 with diameters somewhat smaller than the diameter $d_2$, thus allowing a certain misalignment as described above with reference to the vacuum connector 30.

In order to further improve the grip on the core mask 7—especially with a view to attaining good accuracy and stability in the alignment between the connectors 30 and 31 and the corresponding transfer openings 39 and 48—the arrangement shown may include gripping hooks 49 secured to the "root portions" of the gripping jaws 5 and 6 and adapted to engage hook block 50 on the core mask 7. This arrangement will so to speak add a further dimension to the gripping function, reducing considerably the freedom of movement of the core mask 7 relative to the gripper housing 9.

When the vacuum connector 30 is in its retracted position (not shown) and the compressed-air connectors 31 are in their retracted position shown in FIG. 3, relative movement parallel to the end wall 38 of the core mask 7 - both parallel to and at right angles to the plane of the drawing—may take place without risk of the connectors 30 and 31 being damaged, as there are no parts projecting from the end wall 38 and likely to cause such damage. One exception is, of course, the hook blocks 50, but as the movements of the manipulator 2 carrying the gripper housing 9 are usually controlled in a pre-programmed manner, the probability of the connectors 30 and 31 colliding with the hook blocks 50 is extremely small. As the surface portion 37 is plane, any relative movement of the above-mentioned kind even with the various connectors in their extended or advanced coupling positions is most unlikely to cause any damage to the parts involved, except possibly some slight wear on the sealing lip 34 and the sealing rings 46.

Advantageously, a sensor (not shown), such as a so-called microswitch, may be situated in the bottom of the semi-circular engagement recess in the gripping jaw 5, said sensor being adapted to transmit a signal to the control equipment through leads (likewise not shown), when said recess engages the engagement knob 14 correctly. If so, the control equipment may be adapted to stop the whole plant and/or give an alarm, if the sensor does not transmit such a signal within a short interval of time after the movement of the gripping mechanism to the gripping position shown in FIG. 2. With such an arrangement, dangerous situations may be avoided, for example with the core mask 7 being lifted and then falling out of the gripper; this may cause serious operational disturbances and damage to the plant.

Typical materials for the various components will be
for the connector block 29: steel, brass, aluminium or the like,
for the connectors 30 and 31: steel, brass or the like,
for the sealing lip 34 and the sealing rings 45: oil-resistant, preferably synthetic, rubber or the like, and
for the gripping hooks 49 and the hook blocks 50: steel.

I claim:
1. A system comprising
 (a) a gripper (3) adapted to be moved between various stations and comprising
  (a1) gripping means (5,6,49) adapted when in a gripping position (FIG. 2) to engage cooperating engagement means (14,15,50) on a gripping object (7) and when in a non-gripping position (FIG. 3) to be out of engagement with such cooperating means, and
  (a2) fluid-communication coupling means (30,31) adapted when in said gripping position to engage cooperating fluid-transfer means (37,39,48) of said gripping object (7) and when in said non-gripping position to be out of engagement with such cooperating fluid-transfer means, and
 (b) a number of gripping objects (7) adapted to be moved between various stations by said gripper (3) and each comprising
  (b1) engagement means (14,15,50) adapted to be engaged by said gripping means (5,6,49) on said gripper (3), and
  (b2) fluid-transfer means (37,39,48) adapted to be engaged by said fluid-communication coupling means (30,31) on said gripper (3),
characterized in
 (c) that said fluid-communication coupling means (30,31) on said gripper (3) for providing fluid-communication between said gripper means and said gripping objects are constituted by tubular members with at least one open end, said open ends being adapted to be brought into fluid-tight contact with a substantially plane surface (37) on said gripping object (7) by movement of said gripping means from the non-gripping position to the gripping position, said substantially plane surface (37) comprising fluid-transfer openings (39,48) adapted such that when said gripping object is in said gripping position said fluid transfer openings are situated within the limits of the positions of said open ends of said fluid-communication coupling means defined only by engagement of said gripping object by said gripping means.
2. A system comprising
 (a) a gripper (3) adapted to be moved between various stations and comprising
  (a1) gripping means (5,6,49) adapted when in a gripping position (FIG. 2) to engage cooperating engagement means (14,15,50) on a gripping object (7) and when in a non-gripping position (FIG. 3) to be out of engagement with such cooperating means, and
  (a2) fluid-communication coupling means (30,31) adapted when in said gripping position to engage cooperating fluid-transfer means (37,39,48) of said gripping object (7) and when in said non-gripping position to be out of engagement with such cooperating fluid-transfer means, and
 (b) a number of gripping objects (7) adapted to be moved between various stations by said gripper (3) and each comprising
  (b1) engagement means (14,15,50) adapted to be engaged by said gripping means (5,6,49) on said gripper (3), and
  (b2) fluid-transfer means (37,39,48) adapted to be engaged by said fluid-communication coupling means (30,31) on said gripper (3), characterized in
 (c) that said fluid-communication coupling means (30,31) on said gripper (3) for providing fluid com- munication between said gripper means and said gripping objects are constituted by tubular members with at least one open end, said open end being adapted to be brought into fluid-tight contact with a substantially plane surface (37) on said gripping object (7), said substantially plane surface (37) comprising fluid-transfer openings (39,48) adapted in said gripping position to be situated within the limits of said open ends, and (d) that said fluid-communication coupling means (30,31) are movable relative to said gripper (3) between an extended position in which they extend a distance from the housing (9) of said gripper (3), and a retracted position in which they are withdrawn toward the housing (9) from said extended position.

3. A system according to claim 2, characterized in that said movement of said coupling means (30,31) are effected by mechanical means (36,40) adapted to transmit movement from the actuating mechanism (22,24 etc.) of said gripper (3).

4. A system according to claim 3, characterized in that said mechanical movement-transmission means (36,40) are adapted to operate with lost motion, so as to engage and move said coupling means (30,31) only in the final stage of each movement of said actuating mechanism (22,24).

5. A system according to claim 2, characterized in the said coupling means (30,31) comprise means increasing the sealing pressure against said substantially plane surface (37) with increasing difference between the fluid pressure within said coupling means and the fluid pressure outside of same in the surrounding atmosphere.

6. A system according to claim 2, characterized in that said gripping means (5,6,49) on said gripper (3) and said cooperating engagement means (14,15,50) on said gripping object (7) consist of two separate pairs of means operating simultaneously and substantially at right angles to each other, including.

(a) a first set of gripping (5,6) and cooperating engagement (14,15) means, of which the latter are situated on a first surface of said gripping object (7), and (b) a second set of gripping (49) and cooperating engagement (50) means, of which the latter are situated on a second surface (38) on said gripping object (7), said second surface being substantially at right angles to said first surface.

* * * * *